United States Patent [19]

Takeuchi et al.

[11] Patent Number: 4,881,253

[45] Date of Patent: Nov. 14, 1989

[54] MIS-DETECTION OF A VIDEO SWITCHOVER KEY SIGNAL

[75] Inventors: Kenichi Takeuchi; Shin Saito, both of Tokyo; Shoji Araki; Atsushi Nakayama, both of Kanagawa, all of Japan

[73] Assignees: Nippon Telegraph and Telephone Corporation; Sony Corporation, both of Tokyo, Japan

[21] Appl. No.: 203,927

[22] Filed: Jun. 8, 1988

[30] Foreign Application Priority Data

Jun. 19, 1987 [JP] Japan .................................. 62-152633

[51] Int. Cl.⁴ ....................... H04M 11/00; H04N 7/14
[52] U.S. Cl. .......................................... 379/54; 379/96; 358/85
[58] Field of Search ......................... 379/54, 53, 96–98, 379/100, 106; 358/85, 257

[56] References Cited

U.S. PATENT DOCUMENTS

| 4,099,202 | 7/1978 | Cavanaugh | 358/85 |
| 4,485,400 | 11/1984 | Lemelson et al. | 379/53 |
| 4,584,434 | 4/1986 | Hashimoto | 379/100 |
| 4,715,059 | 12/1987 | Cooper-Hart et al. | 379/53 |

Primary Examiner—Jin F. Ng
Assistant Examiner—Wing F. Chan
Attorney, Agent, or Firm—Hill, Van Santen, Steadman & Simpson

[57] ABSTRACT

A television telephone system utilizes a tone signal of a predetermined duration. The tone signal has a plurality of frequencies and is positioned at the starting portion of a transmission signal. The tone signal reduces the possibility of mis-detection of signals during reception and allows video signals to be transmitted more satisfactorily.

6 Claims, 3 Drawing Sheets

MIS-DETECTION OF A VIDEO SWITCHOVER KEY SIGNAL

BACKGROUND OF THE INVENTION

1. Field of the Invention

The present invention relates generally to a video-phone system and more particularly to a video-phone or television telephone system that can transmit and receive still pictures over existing telephone lines or special telephone lines.

2. Description of the Prior Art

Video-phone or television telephone systems using telephone lines have been previously proposed. According to the conventional television telephone system, a video signal, for example, a picked-up image signal is processed so that it can be transmitted over standard telephone lines and the thus processed video signal is transmitted over the telephone lines in place of telecalls. In this case, during transmission of one of the above-mentioned video signal or the audio signal from the telephone set a change-over can occur by driving a switching relay of the telephone lines in association with predetermined transmitting operations. During reception, the video signal and the audio telephone signal must be automatically changed-over by using a key signal which is detected from the transmitted signal.

In the above-mentioned conventional television telephone system, however, a detecting circuit for detecting the key signal must be connected to the telephone set and to the telephone lines used in the communication system. There is a risk that a part of the audio signal used for communication will be mis-detected as the key signal. Should mis-detection occur in the above-mentioned television telephone system, the television-telephone system will be switched to the receiving mode, and the telephone communication will be interrupted. This is very undesirable. Therefore, detection of the key signal must be accomplished with great care.

Telephones have been used with automatic answering functions. This is called an automatic answering telephone. In an automatic answering telephone during use, a user can remotely control the automatic answering telephone which is installed in the user's home by continuously transmitting to it from a remote location a signal which has a predetermined frequency for a predetermined period of time. In this case, however, in order to avoid mis-detection, the selected predetermined duration must be more than several seconds. Also, in the conventional television telephone system, the transmission of the video signal causes telephone communication to be interrupted for a considerable period. It can be realized from the foregoing description that it is undesirable to interrupt telephone communication for long periods.

As described above, according to the conventional television telephone system, if the key signal is mis-detected, telephone communication is interrupted which is undesirable. Further, to prevent mis-detection of the key signal, the time during which telephone communication is interrupted is increased.

OBJECTS AND SUMMARY OF THE INVENTION

Accordingly, it is an object of the present invention to provide an improved television-telephone system which can obviate the defects encountered with the prior art.

It is another object of the present invention to provide a television-telephone system which can avoid mis-detection of a part of an audio signal which is used as a key signal.

It is a further object of the present invention to provide a television-telephone system which can rapidly and stably identify a key signal.

It is yet a further object of the present invention to provide a television-telephone system which can reduce the time of interruptions of necessary communication.

According to an aspect of the present invention, there is provided a television-telephone system comprising:

(a) an image pick-up section;

(b) a picture receiving section, and the image pick-up section and the picture receiving section are installed within a single location;

(c) an image pick-up control section for timebase-expanding a desired video signal of the image picked-up by said image pick-up section, transmitting through telephone lines said processed video signal to a telephone set of another party, processing said transmission signal and/or a transmission signal received from a terminal apparatus of the other party and reproducing it on said picture receiving section;

(d) tone signal generating means for generating a tone signal of predetermined duration, said tone signal being formed of a plurality of frequencies and located at least in a starting portion of said transmission signal;

(e) detecting means for detecting said tone which has a plurality of frequencies from a received transmitted signal; and (f) means for starting the reception processing of the received transmitted signal when said tone signals are detected as being greater than a predetermined ratio during a predetermined period of time from the received transmission signal.

The above and other objects, features and advantages of the present invention will become apparent from the following detailed description of the preferred embodiment which is to be considered in conjunction with the accompanying drawings, throughout which like reference numerals designate like elements and parts.

BRIEF DESCRIPTION OF THE DRAWINGS

FIG. 4 is a block diagram showing a dual tone identifying circuit used in the present invention; and FIGS. 5A to 5F are, respectively, timing charts used to explain the operation of the present invention.

DETAILED DESCRIPTION OF THE PREFERRED EMBODIMENT

An embodiment of a television telephone system according to the present invention will hereinafter be described with reference to the attached drawings.

Figure 1:
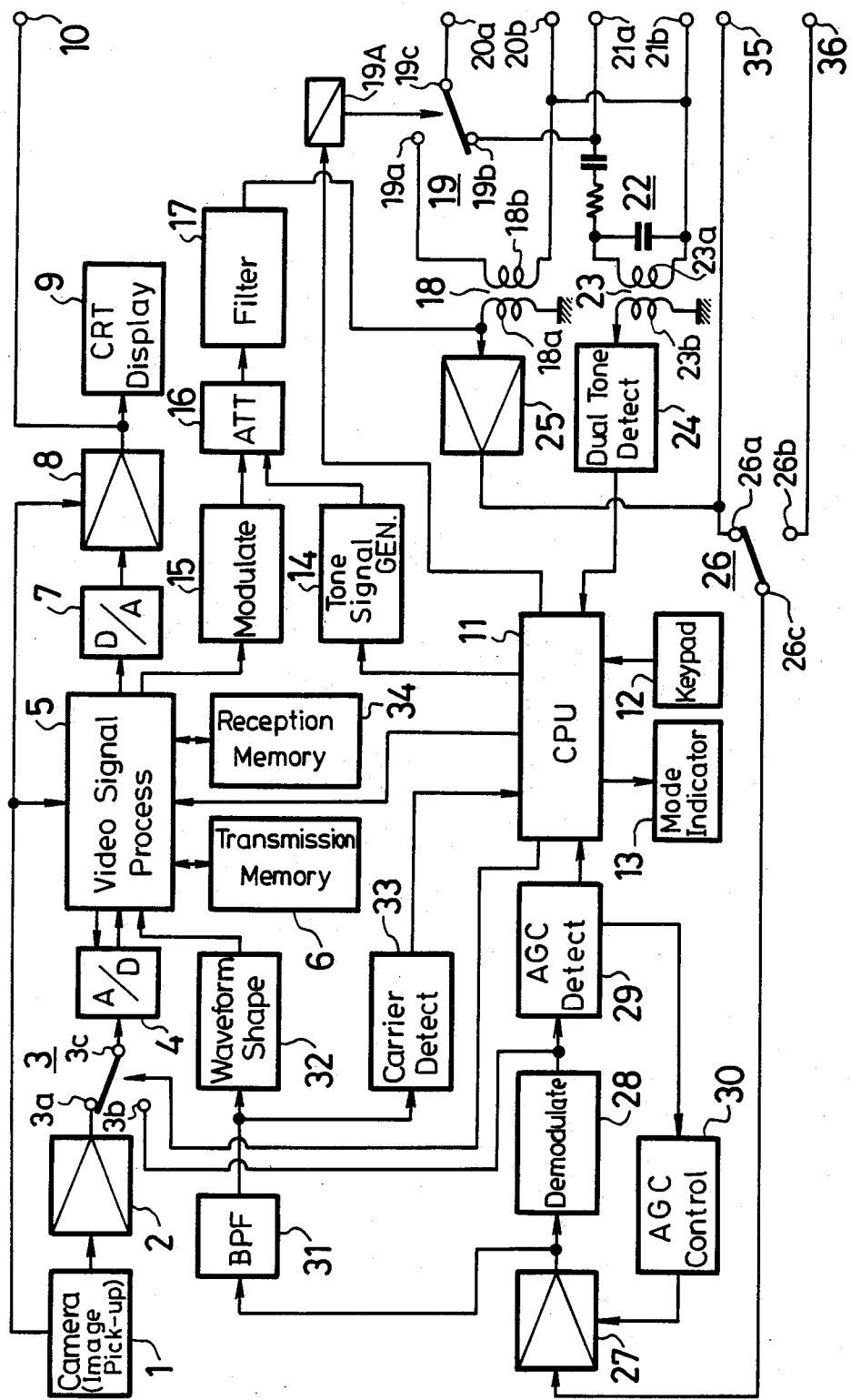
FIG. 1 is a block diagram showing an embodiment of a television-telephone system according to the present invention.

FIG. 1 illustrates an overall circuit arrangement of the embodiment of the television telephone system according to the present invention.

Referring to FIG. 1, there is provided an image pick-up section 1 which includes an image pick-up tube. A (black-and-white) video signal according to, for example, the NTSC system is picked-up by the image pick-up section 1 and is supplied through a buffer amplifier 2 and a fixed contact 3a and the movable contact 3c of a switch 3 to an analog-to-digital (A/D) converting circuit 4, in which it is converted to a digital signal. The digital signal from the A/D converting circuit 4 is supplied to a video processing control circuit 5. A synchronizing signal from the image pick-up section 1 is supplied to the control circuit 5 and in synchronism with the synchronizing signal so that picture elements of 160 dots in the horizontal direction and 100 lines in the vertical direction are extracted from the above-mentioned video signal and then written into a transmission memory 6. The control circuit 5 generates a sampling signal which is associated with the synchronizing signal and supplies it to the A/D converting circuit 4.

The signal from the A/D converting circuit 4 which passes through the control circuit 5 or which is read out from the memory 6 is supplied to a digital-to-analog (D/A) converting circuit 7. The control circuit 5 corrects the picture elements of 160 dots × 100 lines into a signal according, for example, to the NTSC system in association with the synchronizing signal from the image pick-up section 1. An analog video signal from the D/A converting circuit 7 is supplied to an output buffer amplifier 8, in which it is mixed with the synchronizing signal from the image pick-up section 1 and is then fed to a picture receiving section 9 which includes a (black-and-white) cathode ray tube (CRT). The video signal from the output buffer amplifier 8 is supplied to an output terminal 10 to which is connected a video-printer (not shown) or the like.

A microcomputer 11 or a central processing unit (CPU) is provided. The CPU 11 receives a signal which indicates "view", "pick-up", "send" or the like from a control switch 12 or from keys 12a, 12b and 12c which will be described more fully later. The CPU 11 supplies a signal to an indication section 13 which indicates "transmission mode", "reception mode" or the like. When the view key 12a, for example, is depressed, a command signal from the CPU 11 is supplied to the control circuit 5 and the signal from the A/D converting circuit 4 is supplied through the control circuit 5 to the D/A converting circuit 7 with the result that the video signal which is picked-up at the image pick-up section 1 is received and monitored by the picture receiving section 9. Under this condition, when the pick-up key 12b is depressed, the video signal from the A/D converting circuit is written at that time in the memory 6.

When the send key 12c is depressed, the command signal from the CPU 11 is supplied to a dual tone signal generating circuit 14 which generates a predetermined key signal for switching a television telephone system of the other party. Then, the command signal from the CPU 11 is supplied to the control circuit 5, whereby the video signal written in the memory 6 is read out at a low speed If the video signal has not been written into the memory 6 at the time point when the send key 12c is depressed, the control operation for pick-up is effected during a period when the above-mentioned key signal is generated from the dual tone signal generating circuit 14, and the video signal from the A/D converting circuit 4 at that time is written into the memory 6. The video signal read out from the memory 6 is supplied to a modulating circuit 15, and the modulating circuit 15 modulates with the read-out video signal which can be amplitude modulation according to the standard used in general with telephone network lines. Then, the signal from the modulating circuit 15 and the key signal from the dual tone signal generating circuit 14 are supplied to a mixing circuit 16 where there will be produced a predetermined transmission signal.

Figure 2:
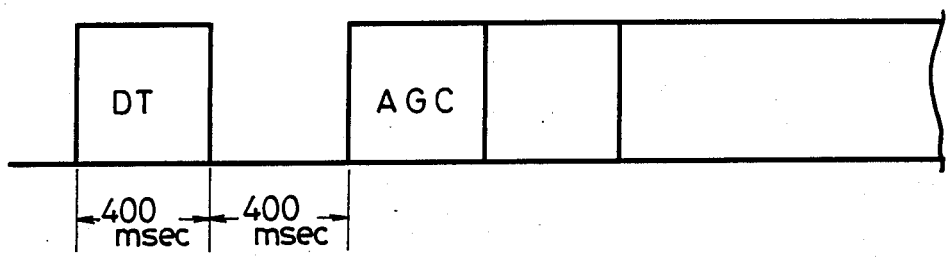
FIG. 2 illustrates a transmission signal used in the present invention.

The transmission signal will be described in more detail. In the television telephone system of the invention, the above-mentioned key signal might be a tone signal, or a dual tone signal having two frequencies such as 2160 Hz, 2860 Hz; 2006 Hz, 1633 Hz; or 1633 Hz, 941 Hz. As, for example, shown in FIG. 2, the transmission signal comprises a dual tone period DT of 400 msec, a signal pause period having a duration (400 msec) equal to that of the dual tone period DT and a video signal period. The video signal period is formed of a period for an AGC (automatic gain control) signal of a predetermined level at the start and a period, for example, for a non-modulated carrier signal indicating the starting portion of a picture.

Turning back to FIG. 1, the thus arranged transmission signal is supplied through a filter 17 to one winding 18a of a first transformer 18. One end of the other winding 18b of the first transformer 18 is connected to a fixed contact 19a of a change-over switch 19 and by the movable contact 19c can be supplied to a terminal 20a which is connected to one end of external telephone lines (not shown), while the other end of the winding 18b of the first transformer 18 is connected to a terminal 20b which is connected to the other end of the external telephone lines.

Thus, when a relay solenoid 19A for the switch 19 is driven by the command signal from the CPU 11 to allow the change-over switch 19 to connect its movable contact 19c to its fixed contact 19a which is opposite to the position shown in FIG. 1, the transmission signal from the filter 17 will be transmitted to the telephone lines. When on the other hand, the relay solenoid 19A does not receive a command signal from the CPU 11, since the movable contact 19c of the switch 19 is connected to the other fixed contact 19b as illustrated, the terminals 20a and 20b are connected, respectively, to terminals 21a and 21b, which are connected to the existing telephone set, thus making it possible to use the television-telephone system of the invention as a standard telephone set.

The terminals 21a and 21b which are connected to the telephone set are connected through a filter 22 to the ends of one winding 23a of a second transformer 23. The filter 22 allows the above-mentioned dual tone signal to pass therethrough. The signal developed at the other winding 23b of the second transformer 23 is supplied to a dual tone detecting circuit 24 and the detected signal therefrom is supplied to the CPU 11. Based on the detected dual tone signal DT, the CPU 11 sets a timer which corresponds to the above-mentioned 400 msec from a time when the first dual tone signal is detected. The time period during which the dual tone signal DT is being detected is calculated. When the total calculated time becomes 100 msec (¼ of the total duration, 400 msec), the key signal is identified. Then, on the basis of the identified results, the CPU 11 is set to the receiving mode.

In the receiving mode, the command signal from the CPU 11 drives the relay solenoid 19A to cause the change-over switch 19 to connect its movable contact 19c to the fixed contact 19a, whereby the signal from the telephone lines is supplied through the transformer 18 to a receiving buffer amplifier 25. The signal from the receiving buffer amplifier 25 is supplied through a fixed contact 26a of a switch 26, and its movable contact 26c and an AGC amplifier 27 to a demodulating circuit 28 which demodulates, or AM-demodulates a signal during a video signal period including the AGC signal which is contained in the above-mentioned transmission signal.

The demodulated signal from the demodulating circuit 28 is supplied to an AGC signal detecting circuit 29. Then, the detected signal level therefrom is supplied to an AGC control circuit 30 which derives a control signal, which permits the AGC signal shown in FIG. 2 to have a predetermiend level which is supplied to the AGC buffer amplifier 27. A signal which indicates that the signal has been detected by the detecting circuit 29 is supplied to the CPU 11, whereby the CPU 11 is maintained in the receiving mode. Alternatively, when no signal is detected by the detecting circuit 29 for a predetermined time period after the dual tone signal DT has been detected, the CPU 11 is released from the receiving mode.

The signal from the demodulating circuit 28 is supplied to the switch 3. The signal from the AGC amplifier 27 is supplied to a band-pass filter 31 which extracts a carrier signal component. Then, the carrier signal component extracted by the band-pass filter 31 is supplied through a waveform shaping circuit 32 to the control circuit 5 in which a sampling signal for the video signal transmitted at low speed is formed and the thus extracted carrier signal is supplied to a carrier signal detecting circuit 33. The detected signal from the detecting circuit 33 is supplied to the CPU 11 which identifies the starting portion of the video signal.

When the starting portion of the video signal has been identified by the CPU 11, a command signal from the CPU 11 causes the switch 3 to connect its movable contact 3c to the other fixed contact 3b which is opposite to the state shown in FIG. 1 which causes the signal from the demodulating circuit 28 to be supplied to the A/D converting circuit 4. Also, the clock signal for sampling operations is supplied from the control circuit 5 to the A/D converting circuit 4, whereby the digitized video signal formed of 160×100 picture elements is written in a receiving memory 34.

Thus, when the above-mentioned transmission signal is transmitted to the television telephone system of the invention from the telephone lines, the thus transmitted video signal is demodulated and then written into the memory 34. Then, the signal written in the memory 34 is changed into a signal according to the NTSC system by the control circuit 5. This signal is supplied through the D/A converting circuit 7 and the output buffer amplifier 8 to the picture receiving section 9.

Further, the signal from the receiving buffer amplifier 25 is supplied to a tape recording terminal 35 and a signal applied to a tape reproducing terminal 36 is supplied through the fixed contact 26b of the switch 26 and the movable contact 26c to the AGC amplifier 27.

According to the television-telephone system of the present invention, as described above, the desired video signal picked-up by the image pick-up section 1 is processed and then is transmitted via the telephone network lines. Also, the thus transmitted signal is processed and then displayed on the monochrome CRT monitor of the picture receiving section 9.

Figure 3:
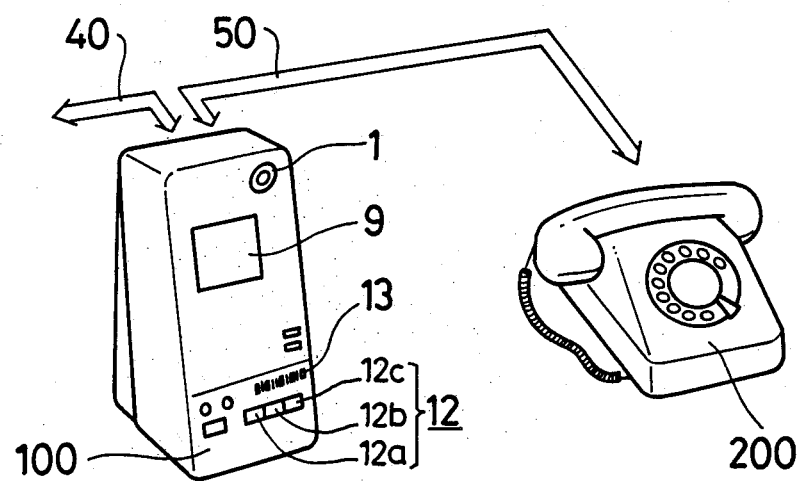
FIG. 3 an illustration of an overall arrangement of the embodiment of the television-telephone system according to the present invention.

FIG. 3 illustrates an overall arrangement of the television-telephone system of the present invention. As FIG. 3 shows, a cable 40 from the telephone lines (not shown) is connected to a television-telephone system 100 and a cable 50 from the television-telephone system 100 is connected to a general telephone set 200. The telephone set 200 is normally connected to the telephone lines (not shown). When the send key 12c on the television-telephone system 100 is depressed, the video signal picked-up by the image pick-up section 1 is transmitted to the telephone lines. When the predetermined video signal from the telephone lines is received, it is displayed on the picture receiving section 9. During transmission or reception, the indicating section 13 which has light emitting diodes (LED) or the like indicates the transmission mode or the reception mode.

According to the television telephone system of the present invention, since there is provided a tone signal of a predetermined duration which has a plurality of frequencies, there is a very small possibility that a part of the audio signal will be erroneously detected. Furthermore, since the tone signal is identified on the basis of the ratio at which the tone signal is detected during the predetermined period of time, the tone signal can be quickly and positively identified, thus making it possible to reduce the time of communication interruption.

In the above-mentioned television-telephone system, it is possible to satisfactorily prevent mis-detection by employing the dual tone signal as the key signal. In experiments, the detecting circuit for detecting the dual tone signal which has frequencies of, for example, 2160 Hz and 2860 Hz was employed to input an audio signal of a television broadcasting signal for an hour. The results of the experiments revealed that no misdetections occurred. Conversely, when a dual tone signal having a single frequency of 2160 Hz was employed, mis-detection occurred several times per minute.

Further, in the above-mentioned television-telephone system, the pause period with a duration equal to that of the dual tone signal is provided after the dual tone signal so that if the signal levels from the dual tone signal during the pause period are averaged, the resultant average signal level becomes −3 dB of the dual tone period. Accordingly, if the signal level of the dual tone period is determined to be +3 dB for the standard of the telephone lines, the average signal level can fall within the standard of the telephone line so that the dual tone signal can be stably detected by increasing the signal level of the dual tone signal.

Furthermore, in the television-telephone system of the present invention, since the duration of the dual tone period is selected to be the predetermined period and the ratio that is detected during this period the dual tone signal is used to identify the key signal, it is possible to identify the key signal very positively and quickly. The dual tone signal identifying circuit is constructed as, for example, shown in FIG. 4.

Figures 4, 5C, 5D, 5E, 5F:
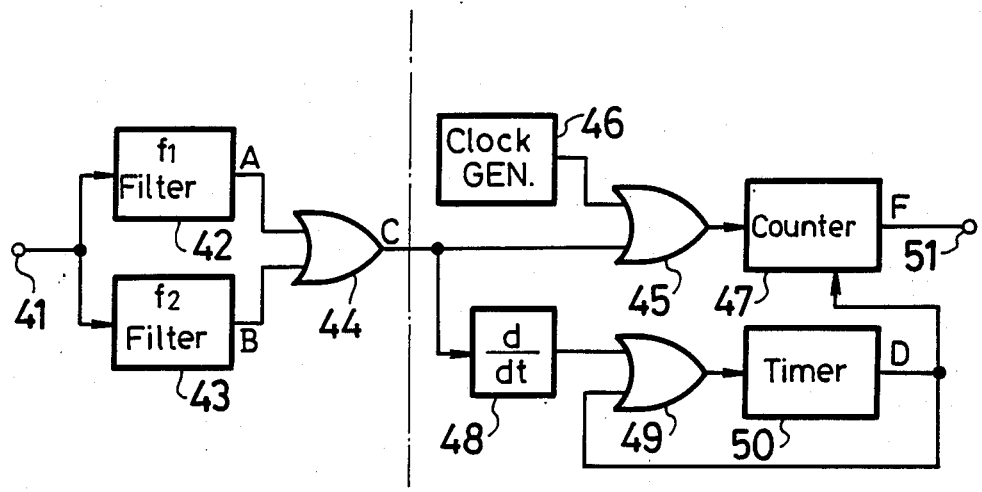

Referring to FIG. 4, the signal from the second transformer 23 (FIG. 1) is supplied through a terminal 41 to narrow-band filters 42 and 43 which pass two frequencies f1 and f2 of the dual tone signal. The filters 42 and 43 respectively produce signals which become low in potential when the dual tone signals exist, as, for example, shown in FIGS. 5A and 5B. These signals are supplied to an OR circuit 44 which derives a signal having the waveform shown in FIG. 5C. The signal from the OR circuit 44 is supplied to an OR circuit 45. A predetermined clock signal from a clock circuit 46 is supplied to the OR circuit 45 and a signal from the OR circuit 46 is supplied to a counter 47. The signal from the OR circuit 44 is supplied to a differentiating circuit 48 and the differentiated output therefrom is supplied through an OR circuit 49 to a timer circuit 50 of 400 msec. The timer circuit 50 derives a signal shown in FIG. 5D. This signal is supplied to a reset terminal of the counter 47 and to the OR circuit 49. Accordingly, the counter 47 begins to count as shown in FIG. 5E. When the count value of the counter 47 reaches a value equivalent to 100 msec, the counter 47 produces a dual tone identified output as shown in FIG. 5F. In the above-mentioned circuit arrangement shown in FIG. 4, the right-hand side of the circuitry relative to a one-dot chain line is realized in practice by the software provided within the CPU 11.

Further, in accordance with the above-mentioned apparatus, since the arrival of the AGC adjusting signal in the reception mode is detected after the dual tone signal is identified, even if the dual tone signal is erroneously detected, the dual tone signal can be correctly identified by the absence of the AGC signal, thus making it possible to solve the problem of malfunction in a short period of time.

According to the above-mentioned embodiment, the video signal is transmitted in a one-sided fashion during transmission so that when the above-mentioned television-telephone system is not provided at the reception side, the transmission may be affected due to a malfunction. To remove such a defect, a variant of the above-mentioned television telephone system is possible in a manner such that after the dual tone signal has been identified, the dual tone signal generating circuit 14 at the reception side is driven to transmit an answer tone signal to the transmitting site. In response to the answer tone signal, the transmitting site starts to transmit the video signal to thereby remove a risk of the above erroneous transmission. In this case, the transmitting site must identify the answer tone signal. To this end, an identifying circuit must be connected to the output side of the receiving buffer amplifier 25. Alternatively, the relay switch 19 must connect the movable contact 19c to the fixed contact 19b (or to the transformer 23 side) after the transmission of the dual tone signal and after the answer tone signal has been identified, the relay switch 19 connects the movable contact 19c to the fixed contact 19a. Furthermore, since the answer tone signal is produced during a restricted period, the answer tone signal need not be identified so positively as the above-mentioned key signal. For example, a single tone signal may be produced in a short period of time.

According to the present invention, as set forth above, since there is provided the tone signal of a predetermined duration having a plurality of frequencies, there is a very small possibility that a part of the audio signal will be mis-detected as the tone signal. Also, since the tone signal is identified by the ratio in which such tone signal is detected during the predetermined period of time, the tone signal can be identified positively and quickly, thus making it possible to reduce the communication interruption time.

The above description is presented by way of example during a single preferred embodiment of the invention and it will be apparent that many modifications and variations thereof could be effected by one skilled in the art without departing from the spirit and scope of the novel concepts of the invention so that the scope of the invention should be determined only the appended claims.

We claim as our invention:

1. A television telephone system comprising:
   (a) an image pick-up section;
   (b) a picture receiving display section, said image pick-up section and said picture receiving display section counted within a single housing;
   (c) an image pick-up control section for timebase-compressing a desired video signal from said image pick-up by said image pick-up section, transmitting through telephone lines said desired video signal to a television telephone set of the other party, processing said desired video signal and an audio signal from a terminal apparatus of said other party and reproducing the video signal on said picture receiving display section;
   (d) a tone signal generating means for generating a tone signal having a predetermined duration, said tone signal being formed of at least of two frequencies and positioned at least at the starting portion of said transmission video signal;
   (e) a detecting means for detecting said tone signal having at least two frequencies from a received transmission signal; and
   (f) a means for starting the reception processing of the received transmission signal when said tone signals are detected for more than a predetermined ratio of a predetermined period of time from the received transmission signal.

2. A television telephone system according to claim 1, wherein said video signal includes a signal pause period of a predetermined duration which is provided after said tone signal.

3. A television telephone system according to claim 1, wherein said video signal includes a non-modulated signal having a predetermined duration which is provided after said tone signal.

4. A television telephone system as claimed in claim 1, further comprising a change-over switch means for automatically switching a telephone lines from a standard telephone to said video signal processing means when said tone signal is detected by said tone signal detecting means.

5. A television telephone system according to claim 1, wherein said tone signal detecting means produces a change-over key signal when the integrated time value of said received tone signal reaches a predetermined value.

6. A television telephone system according to claim 1 including a microcomputer forming a part of said image pickup control section.

* * * * *